United States Patent
Jungreis et al.

(12)

(10) Patent No.: US 6,369,461 B1
(45) Date of Patent: Apr. 9, 2002

(54) HIGH EFFICIENCY POWER CONDITIONER EMPLOYING LOW VOLTAGE DC BUS AND BUCK AND BOOST CONVERTERS

(75) Inventors: Aaron M. Jungreis, Cary, NC (US); Vinod Bapat, Holmdel, NJ (US)

(73) Assignee: ABB Inc., Raleigh, NC (US)

( * ) Notice: Subject to any disclaimer, the term of this patent is extended or adjusted under 35 U.S.C. 154(b) by 0 days.

(21) Appl. No.: 09/653,663

(22) Filed: Sep. 1, 2000

(51) Int. Cl.[7] ................................................. H02J 1/12
(52) U.S. Cl. .............................. 307/46; 307/66; 307/23; 429/12; 429/22
(58) Field of Search ...................... 429/12, 22; 307/66, 307/46, 23

(56) References Cited

U.S. PATENT DOCUMENTS

| | | | | |
|---|---|---|---|---|
| 5,150,032 A | * | 9/1992 | Ho | 307/48 |
| 5,373,195 A | * | 12/1994 | De Doncker et al. | 307/46 |
| 6,198,177 B1 | * | 3/2001 | Mao et al. | 307/66 |
| 6,225,708 B1 | * | 5/2001 | Furukawa et al. | 307/66 |

* cited by examiner

Primary Examiner—Shawn Riley
(74) Attorney, Agent, or Firm—Woodcock Washburn LLP

(57) ABSTRACT

A power conditioner interfaces a load to a fuel cell 10 that produces a low voltage that varies with the load. A dc-to-ac inverter 16 operates with a low voltage input provided by a dc bus 14. When a positive step load change occurs, a low voltage battery 22 provides power equal to the step change until the fuel cell 10 is able to provide enough power to support the entire load. The power from the battery 22 is supplied to the varying dc bus 14 through a boost converter 12. When very large positive load step changes occur, the battery can feed power to the dc bus through diode D1, rather than through the boost converter. Diode D1 does not need to be used, but its use allows the boost converter to be sized for common load changes rather than for the maximum possible load change (such as might be seen during a faulted output). A buck converter converts the variable voltage on the dc bus 14 to the appropriate float charging voltage of the battery. The buck converter also supplies power for auxiliary equipment when available from the fuel cell. If the fuel cell is unable to provide the auxiliary power (such as during startup or load transients), then the auxiliary power can come directly from the battery.

25 Claims, 2 Drawing Sheets

HIGH EFFICIENCY POWER CONDITIONER EMPLOYING LOW VOLTAGE DC BUS AND BUCK AND BOOST CONVERTERS

FIELD OF THE INVENTION

The present invention relates generally to electrical power transmission and distribution equipment, and more particularly to a high efficiency power conditioner for providing electrical power to a load.

BACKGROUND OF THE INVENTION

A fuel cell typically produces a low voltage at high current. The low voltage produced by the fuel cell varies with the operating conditions and load. When a positive load step occurs, the fuel cell is typically unable to quickly respond to the load change. It is therefore necessary to use an energy storage element such as a battery to provide the balance of power while the fuel cell "catches up" in its ability to provide all of the required power to the load.

Many applications for a fuel cell require an alternating current (ac) output that provides power efficiently over a large range of load. The high-efficiency requirements of these applications typically preclude the use of multiple stages of power conversion. Since a high-efficiency system must minimize the number of power conversion stages, it is difficult to produce a system that can control the sharing of power between the fuel cell and battery while maintaining high system efficiency over a large load range.

A goal of the present invention is to solve this problem by providing a high efficiency power conditioner while avoiding the need for multiple stages of power conversion along the main power path.

SUMMARY OF THE INVENTION

The present invention provides a power conditioner that converts varying dc power from a dc source (such as, e.g., a fuel cell) to ac power in such a way as to provide a very high efficiency during normal operation as well as allowing control of power from the dc source. Such control can be very useful for small generation devices, and particularly fuel cells that require very high operating efficiencies at partial loads but would also profit from the ability to control power flow from the fuel cell.

One exemplary implementation of the invention provides a power conditioner for conditioning electrical power provided by a generation device to a load. The generation device could be a fuel cell, for example, or a combination of a fuel cell (or other medium) in parallel with energy storage media, such as an electrolytic capacitor and/or flywheel system. This embodiment of the power conditioner includes a dc-to-ac inverter; a dc bus coupled to the dc-to-ac inverter; a low voltage power supply operatively coupled to the dc bus; a buck converter coupled between the low voltage power supply and the dc bus; and a boost converter coupled between the low voltage power supply and the dc bus. The low voltage power supply may include a battery or other device for supplying power.

Other aspects of the present invention are disclosed below.

DETAILED DESCRIPTION OF PREFERRED EMBODIMENTS

Figure 1:
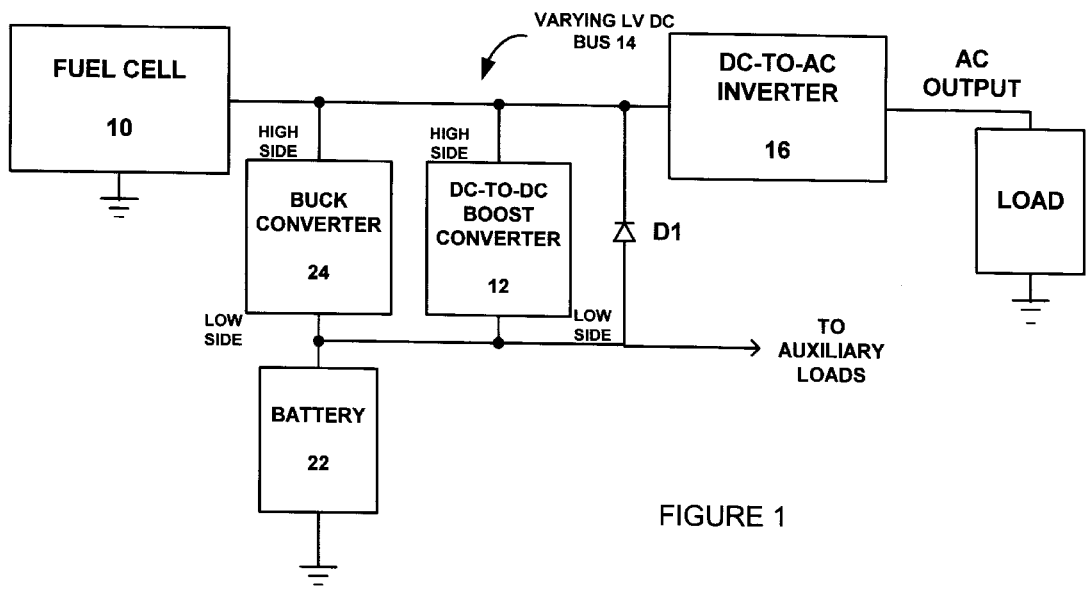
FIG. 1 schematically depicts one preferred embodiment of a power conditioner in accordance with the present invention.

FIG. 1 illustrates one presently preferred implementation of a high efficiency power conditioner in accordance with the present invention. In the circuit of FIG. 1, the fuel cell 10 produces a low voltage that varies with the load. The battery 22 is sized to produce approximately the same voltage as the minimum operating fuel cell voltage. The dc-to-ac inverter 16 in this circuit is designed to operate with a low voltage input. A transformer (not shown) at the output of the dc-to-ac inverter can be used to boost the ac voltage to any desired level.

When a positive load step change occurs, a low voltage battery 22 provides power equal to the step change until the fuel cell 10 is able to support the entire load. The power from the battery 22 is supplied to the varying dc bus 14 through a boost converter 12. This boost converter allows full control of the battery power, so that the power drawn from the fuel cell can be gradually increased as the fuel supply is gradually increased. When very large positive load step changes occur, the battery can feed power to the dc bus through diode D1, rather than through the boost converter. If the current flows through diode D1, there will be no way to control the sharing of current between the fuel cell and the battery; however, such load changes will rarely occur in most applications. Diode D1 does not need to be used, but its use allows the boost converter to be sized for common load changes rather than for the maximum possible load change (such as might be seen during a faulted output). The use of D1 can therefore lead to substantial savings in the cost of the boost converter 12. In cases where the battery needs to supply power for very large load step changes for only short periods of time, the boost converter can economically be designed to handle such short term overloads merely by designing the main switching inductor to have an air-core. Air-core inductors cannot saturate and can therefore pass high over-currents for short periods of time.

When the fuel cell 10 has enough reserve power to both charge the battery 22 and supply all of the load power, a buck converter 24 provides charging current to the battery. The buck converter converts the variable voltage on the dc bus 14 to the appropriate float charging voltage of the battery. The buck converter also supplies power for auxiliary equipment when available from the fuel cell. If the fuel cell is unable to provide the auxiliary power (such as during startup or load transients), then the auxiliary power can come directly from the battery.

Figure 2A:
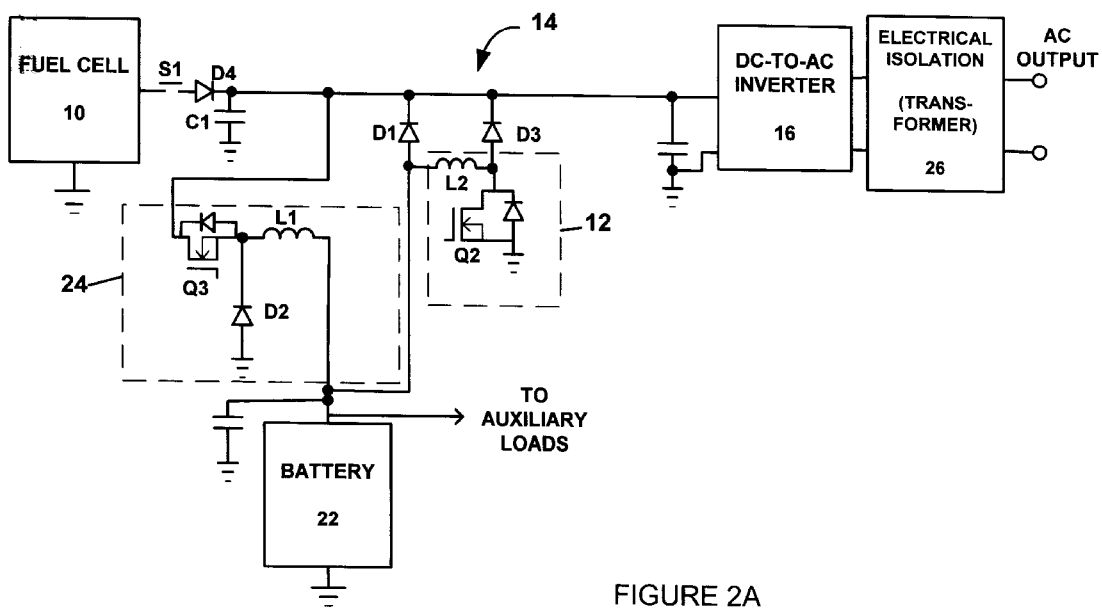
FIG. 2A schematically depicts a more detailed implementation of the solution depicted in FIG. 1.
Figure 2B:
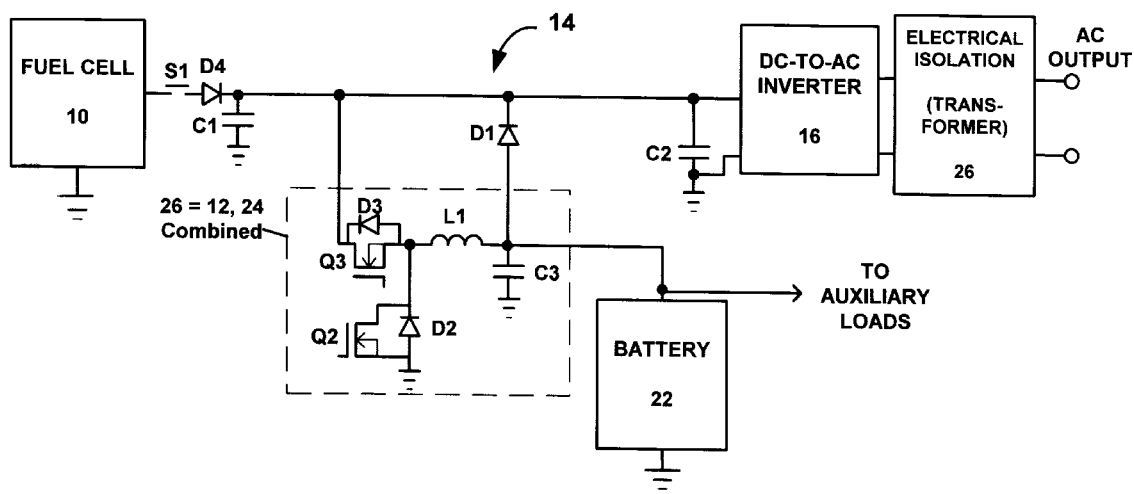
FIG. 2B depicts an implementation in which the buck and boost converters have been combined.

FIGS. 2A and 2B show exemplary implementations of the inventive solution shown in FIG. 1. These implementations are similar, but in FIG. 2B the buck and boost converters 24 and 12 are combined into a single bi-directional power flow converter 26. During normal operation, Q2 remains off, and Q3 is pulse-width-modulated to produce an appropriate battery float charge voltage as well as power auxiliary equipment. When a small positive load step change occurs, the buck converter reduces the amount of power provided to the auxiliary equipment in an amount equal to the load step change. The battery then provides the balance of power to the auxiliary equipment. As the fuel cell is able to provide more power, the power flow to the auxiliary equipment is increased accordingly.

If the positive load step change is greater in magnitude than the auxiliary power, then the buck converter 24 is turned off completely while the boost converter 12 draws the required balance of power (over-and-above that of the auxiliary power) from the battery and provides it to the dc bus.

At startup, the boost converter allows the battery voltage to be boosted in order to charge the bus capacitor C1 up to the open-circuit fuel cell voltage. Pre-charging C1 insures that there will be no inrush current when switch Si is closed.

At any given time, it is only necessary to operate either the buck converter 24 or the boost converter 12, depending on which direction the power needs to flow between the battery and the dc bus. Since only one of these converters is on at any given time, the operation of the semiconductors Q2 and Q3 in bi-directional converter 26 (shown in FIG. 2B) is the same as the operation of Q2 and Q3 in the converters shown in FIG. 2A.

The diode D4 next to switch S1 is not necessary if S1 is a fast switch. Its purpose is to protect the fuel cell(s). Moreover, diode D1 is used for large load steps, and so it may be omitted in applications where such large load steps are not expected or where the boost converter is sized to handle the maximum possible load step.

The scope of protection of the following claims is not limited to the presently preferred embodiments described above. Those skilled in the art will recognize that modifications and variations of the specific embodiments disclosed herein will fall within the true spirit and scope of the present invention.

Possible modifications of the embodiments described above include the following: The energy storage could be provided by a number of different storage media separately or in combination such as a large capacitor or a flywheel system. If more than one energy storage medium is used, then they can either be directly paralleled (which requires they have identical voltage output) or they can each have an accompanying buck and boost converter to tie into the dc bus. The preferred embodiment comprises a battery whose output voltage is similar to the minimum operating voltage of the fuel cell; however, if an electrolytic capacitor or flywheel system is used, it is probably more useful to design the maximum operating voltage of the fuel cell to be less than the minimum voltage of the capacitor or flywheel system. If the maximum fuel cell voltage is lower than that of the minimum operating energy storage voltage, the operation of the buck and boost converters would have to be swapped with each other. (If a supercapacitor is used, it would probably be designed to have a maximum output voltage which is less than the minimum operating voltage of the fuel cell, just as is the case for the preferred embodiment.)

It is also possible to use a battery, capacitor, or other suitable dc energy storage element that has a terminal voltage well below the minimum operating voltage of the fuel cell. The use of an energy storage element with such a low terminal voltage would require that the boost converter be sized to process the maximum load power. Also, diode D1 would not be used in such a design since the energy storage terminal voltage would never be close enough to the fuel cell voltage to forward bias the diode.

We claim:

1. A power conditioner for conditioning electrical power provided by a fuel cell to a load through a dc-to-ac inverter, comprising:
   (a) a dc bus coupled to the fuel cell and the dc-to-ac inverter;
   (b) a battery operatively coupled to the dc bus;
   (c) a buck converter coupled between the battery and the dc bus; and
   (d) a boost converter coupled between the battery and the dc bus.

2. A power conditioner as recited in claim 1, wherein a low side of the buck converter is coupled to the battery and a high side of the buck converter is coupled to the dc bus.

3. A power conditioner as recited in claim 2, wherein a low side of the boost converter is coupled to the battery and a high side of the boost converter is coupled to the dc bus.

4. A power conditioner as recited in claim 3, further comprising a diode (D1) coupled between the battery and the dc bus.

5. A power conditioner as recited in claim 4, wherein the diode is configured such that, when very large positive load step changes occur, the battery can feed power to the dc bus through the diode rather than through the boost converter.

6. A power conditioner as recited in claim 1, wherein the dc-to-ac inverter is designed to operate with a low voltage input, and the low voltage input is provided by the dc bus.

7. A power conditioner as recited in claim 1, wherein, when a positive step load change occurs, the battery provides power, through the boost converter and dc bus, equal to the step change until the fuel cell is able to provide enough power to support the entire load.

8. A power conditioner as recited in claim 7, wherein the boost converter permits control of the battery power so that the power drawn from the fuel cell can be gradually increased as the ability of the fuel cell to produce the required load power gradually increases.

9. A power conditioner as recited in claim 8, wherein, when very large positive load step changes occur, the battery feeds power to the dc bus through a diode (D1) rather than through the boost converter.

10. A power conditioner as recited in claim 9, wherein, when the fuel cell has enough reserve power to both charge the battery and supply all of the load power, the buck converter provides charging current to the battery.

11. A power conditioner as recited in claim 10, wherein the buck converter converts a variable voltage on the dc bus to a float charging voltage of the battery.

12. A power conditioner as recited in claim 11, wherein the buck converter further supplies power for auxiliary equipment when available from the fuel cell.

13. A power conditioner as recited in claim 12, wherein a low side of the buck converter is coupled to the battery and a high side of the buck converter is coupled to the dc bus; wherein a low side of the boost converter is coupled to the battery and a high side of the boost converter is coupled to the dc bus; and wherein the diode is coupled between the battery and the dc bus.

14. A power conditioner for conditioning electrical power provided to a load, comprising:
   a dc-to-ac inverter having an output providing ac output power for the load;
   a low voltage, variable dc bus coupled to a power generation device and the dc-to-ac inverter;
   a low voltage energy storage medium operatively coupled to the dc bus;
   a buck converter coupled between the low voltage energy storage medium and the dc bus; and
   a boost converter coupled between the low voltage energy storage medium and the dc bus.

15. A power conditioner as recited in claim 14, wherein the energy storage medium is a member of a group consisting of a battery, electrolytic capacitor, super capacitor, and flywheel system.

16. A power conditioner as recited in claim 15, further comprising one or more energy storage media that are paralleled with the power generation device.

17. A power conditioner as recited in claim 16, wherein the energy storage media are directly paralleled and have identical voltage output.

18. A power conditioner as recited in claim 16, wherein the energy storage media are indirectly paralleled by coupling their respective output to a bus via an accompanying buck and boost converter to tie into the dc bus.

19. A power conditioner as recited in claim 18, wherein a fuel cell is coupled in parallel with one of an electrolytic capacitor and a flywheel system, and the fuel cell has a maximum operating voltage that is less than a minimum operating voltage of the electrolytic capacitor and flywheel system.

20. A power conditioner as recited in claim 14, wherein the buck and boost converters are combined into a bidirectional converter.

21. A power conditioner as recited in claim 14, wherein the low voltage power supply comprises a battery.

22. A power conditioner as recited in claim 14, wherein the boost converter includes an air-core switching inductor, wherein the air-core inductor is able to pass high over-currents for short periods of time.

23. A power conditioner as recited in claim 1, wherein the buck and boost converters are combined into a bi-directional converter.

24. A power conditioner as recited in claim 1, wherein the fuel cell is coupled in parallel with an energy storage medium and has a maximum operating voltage that is less than a minimum operating voltage of the storage medium.

25. A power conditioner as recited in claim 1, wherein the boost converter includes an air-core switching inductor, wherein the air-core inductor is able to pass high over-currents for short periods of time.

* * * * *